Patented Apr. 22, 1941

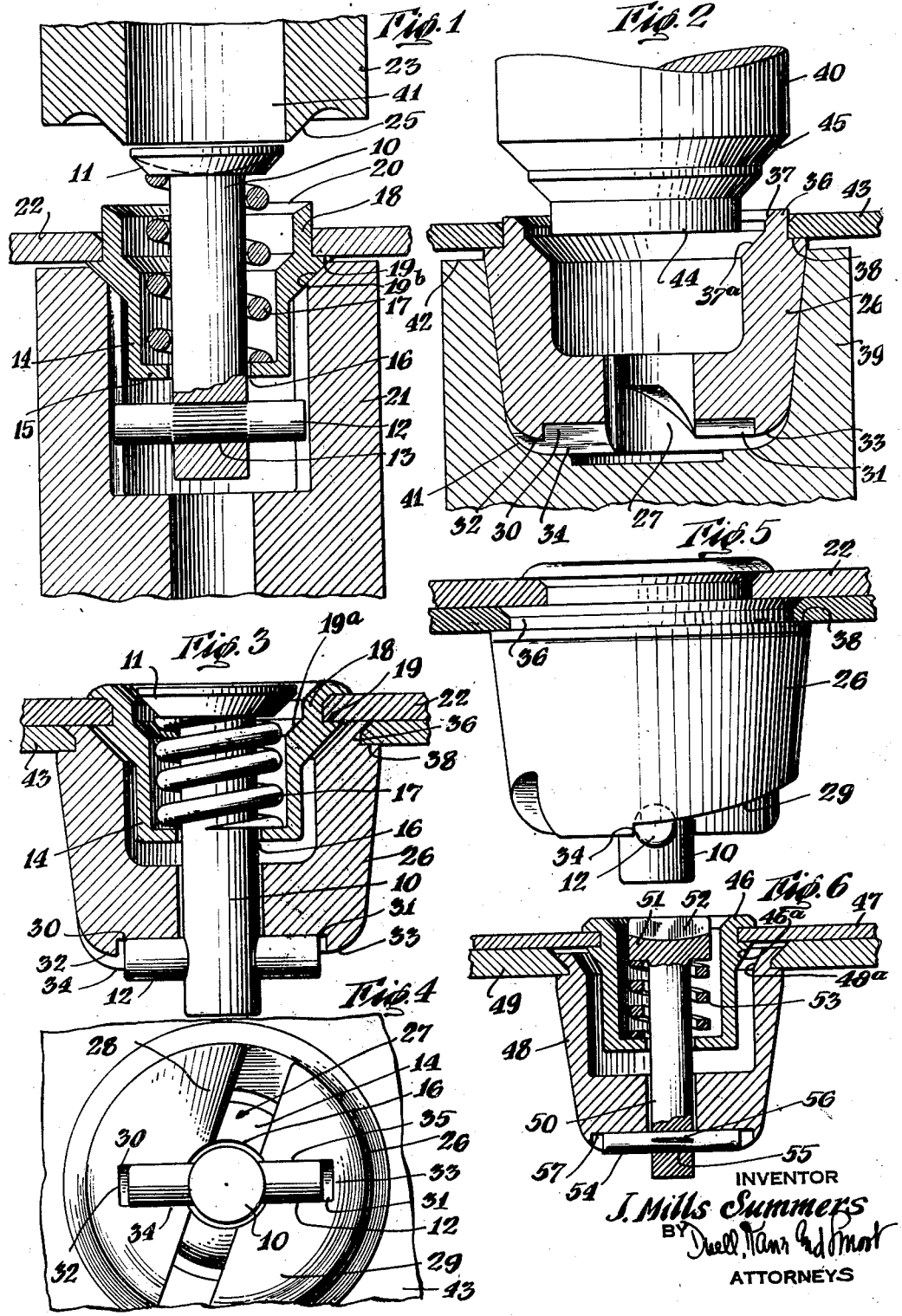

2,239,125

UNITED STATES PATENT OFFICE 2,239,125

FASTENER

J Mills Summers, Englewood, N. J.

Application June 20, 1939, Serial No. 280,080

11 Claims. (Cl. 24—221)

This invention relates to a new and improved fastening device.

It is an object of the invention to provide such a device in which each of two cooperating members are carried independently by the two layers of material to be joined and which, when united, maintain the latter against both tension and shear stresses.

Another object is that of providing a fastener adapted for application in a wide range of installations and which is particularly suited for use, for example, in aircraft or other types of use demanding high safety factors.

A further object is that of providing a fastener in which the load of a tension strain is spread over a substantial area of the fastener and more positive co-action of the parts is assured.

Still another object is that of providing a fastener of this type which stresses quick fastening and unfastening characteristics and which is self-alining during the assembly operation.

A further object is that of providing a fastener of this type in which any wear that may occur is limited strictly to the parts of the fastener and in which worn parts may be quickly removed and replaced without mutilating or destroying the members to which they are secured.

A still further object is that of providing a fastener having limited spring loading characteristics and in which the two parts of the fastener may co-act to remove all further loading of the spring and thus limit further separation of the plates to which said fastener members are connected.

Still another object is that of providing a fastener of this type which may be substantially flush mounted without dimpling of the plate members to which it is attached and which cannot be falsely fastened, as the stud head of the fastener will only remain flush when the parts are properly assembled.

With these and other objects in mind, reference is had to the attached sheet of drawings, in which Fig. 1 is a cross section through the movable portion of a fastener embodying my invention shown with the assembly tools for securing the same in position on a member to be fastened;

Fig. 2 is a cross-section through the socket portion of the fastener shown in Fig. 1 and adapted to cooperate therewith, the assembly tools for said socket portion being also represented in said figure;

Fig. 3 is a cross-sectional view of an assembled fastener comprising the parts embodied in the preceding views;

Fig. 4 is a partial plan view of the bottom of the fastener shown in Fig. 3;

Fig. 5 is a side elevation thereof;

Fig. 6 is a cross-sectional view of a slightly modified form of fastener embodying the invention set forth herein.

Referring now primarily to Figs. 1 through 5, the fastener therein illustrated comprises a rotatable stud member 10 formed with a slotted head 11 at its upper end and a cross-bar 12 adjacent its lower end. The cross-bar is preferably knurled or ribbed, as at 13, and secured in place in a transverse opening at the lower end of the stud 10 by means, for example, of a dry friction fit. The ends of cross bar 12 provide transversely extending abutments upon stud member 10.

Said stud is positioned in a spring retaining collar member 14 which encircles the former for a substantial portion of its length.

Said spring retaining collar has a central opening 16 at the bottom thereof, through which said stud extends, and the cross-bar 12 is located below the lower edge of said collar, preventing the accidental displacement of the stud from the collar when the parts are once assembled.

A coil spring 17 encircles said stud from the under surface of the head 11 to the base 15 of the spring retaining collar 14. When in rest position, the spring tends to keep the stud head 11 above the level of the top of the collar member as shown in Fig. 1.

Said spring retaining collar is provided with an upper flange 18, the lower edge of which is defined by the shoulder 19, and it is also provided with an outer or external annular bevelled bearing 19b intermediate its ends in such location that in assembling position the bevelled bearing is closely adjacent to the member to be fastened. For purposes of installation, a hole is drilled in the plate or other member to which the fastener part is to be applied of the same diameter as the flange 18. The spring retaining collar is then inserted in said opening so that the shoulder 19 comes to rest on the under surface of the plate. In this connection it will, of course, be observed that the flange 18 may be of varying lengths to cooperate with different thicknesses of plates but in all events should be slightly in excess of the plate thickness to which it is applied. The upper edge of the flange may be provided with an inward taper, as at 20. In assembly, a punch and die are utilized, the bottom die 21 having a slotted recess to accommodate a stud cross-bar and the spring retaining collar member but engaging the shoulder 19 as has been illustrated. As shown in Fig. 1, the die 21 stops short of the under surface of the plate or member 22 to which the fastener part is to be secured.

The punch 23 also has an annular flange 25 adjacent the periphery of the stud head accommodating recess 24 and for cooperation with the surface 20 of the flange 18, it being noted that the flange 25 has a greater degree of angularity than the surface 20. As the punch 23 is pressed in position against the fastener part, the flange 25, by acting on the surface 20, spreads the latter and forces the flange 18 to assume the position shown in Fig. 3, thus locking the collar in position on the plate.

Cooperating with the fastener part just described is the socket member of the fastener which comprises a body 26 formed with a slot shaped longitudinal opening 27 for accommodating the stud 10 and cross-bar 12. A pair of opposed cam or spiral trackway portions 28 and 29 are also formed on the under surface of said socket member and which start adjacent the opening 27 and extend in opposed spirals to the bottom of said body, said trackway portions cooperate with and accommodate the ends of the cross-bar 12 carried by said stud and the camming of the latter on said spiral surfaces, as the stud is rotated, cause the latter to be projected downwardly within said socket.

Detents 30 and 31 are provided at the end of said trackway portions to accommodate said cross-bar in assembled position, said detents having shoulders 32 and 33 adjacent the ends of said cross-bar to prevent lengthwise movement of the latter.

The socket body is also built up in the form of a wall 34 and 35 beyond said detents to prevent an overriding of said cross-bar after the detent has been reached.

For attachment, said socket is provided with a flange 36 extending upwardly, said flange having a tapered surface 37 at its upper limit. A shoulder 38 is likewise provided and which defines the lower limit of said flange. Also, closely adjacent to and below tapered surface 37 there is provided an internal annular bevelled bearing 37a as indicated; the said internal bearing loosely fitting over and cooperating with external bearing 19b of the spring collar member 14 in such fashion as to center the fastener parts for easy assembling and to provide annular bevelled bearing surfaces to restrict any substantial lateral movements of said parts.

In assembly, the same method as has heretofore been described in connection with the other fastener part is employed. The plate or member 43 to which said socket is to be secured is drilled with a hole of the same diameter as the flange 36. Said flange is then inserted in said opening so that the shoulder 38 rests against the bottom surface of said plate.

Likewise, as has already been described, in connection with the first fastener part, assembly tools 39 and 40 are employed, the first being formed with an inner recess 41 for accommodating the socket 26, and tapered to bear against the sides of said socket as well as the bottom surfaces 34 and 35 and with an annular upper edge 42 adapted to rest short of the under surface of the plate.

The tool member 40 is formed with a projecting plug 44 of a diameter the same as that of the inside diameter of the socket 26 and a flared shoulder portion 45 which cooperates with the edge 37 of the flange 36 as the tool is driven in place, causing the flange to be flared outwardly and assume the position shown in Fig. 5.

In this connection, it will be appreciated that a socket member of the type just described could be struck out of a sheet of metal and made integral therewith thus obviating the necessity of fastening the same to the sheet or plate by means of a flange member. Once the parts have been assembled to their respective plates the movable or male portion of the fastener is inserted in the socket so that the cross-bar 12 conforms with the opening 27 in the socket and then rotated by means, for example, of a key or other turning means cooperating with the slotted head 11 of the stud. This causes the ends of the cross-bar 12 to engage the camway in the socket and thus cause the cross-bar to ride outwardly along said cam until the position of rest at the detent 30—31 is reached. As the cross-bar is carried along the cam part, through the rotation of the stud, the latter drives downwardly in the socket against the compressive action of the spring 17 and when the cross-bar reaches its position of rest within the detent 30—31 the parts appear as in Fig. 3, with the head of the stud preferably flush with, or slightly below, the surface of the upper plate.

It will be observed that any pull between the plates will cause the stud and head 11 to ride downwardly as the bottom plate and socket members are moved, further compressing the spring 17. However, once the undersurface of the head 11 comes to rest against the inner surface of the socket shoulder 19, which is illustrated, for example, in Fig. 3 as 19A, a further separation of the parts becomes impossible and the direct pull is assumed by the stud and socket members. Such construction has the decided advantage of reducing spring load after a preliminary point has been exceeded and adds considerably to the strength and utility of the fastener.

In Fig. 6, a modified type of fastener has been shown comprising a collar 46 secured to an upper plate 47 in the manner heretofore described said collar being provided with an outer or external annular bevelled bearing surface 46a intermediate its ends and in such location that in assembling position, the bevelled bearing is closely adjacent to the member to be fastened, and a socket 48 secured to a lower plate 49 in similar fashion. Said socket is also provided with an internal annular bevelled bearing surface 48a as indicated, said internal bearing surface cooperating with the external bearing surface 46a of the spring collar 46 and restricting any substantial lateral movement between the collar and the socket. Carried by the collar is a stud 50, having a head 51, which may be slotted as at 52. Positioned between the under surface of said head and the base of the collar may be, for example, a coil spring 53 which, as will be noted, may be formed of square stock. A cross-bar 54 may be driven through a transverse opening 55 formed adjacent to the bottom of the stud and said cross-bar may have a series of spaced serrations as at 56 to prevent rotation of said bar once it has been forced in position in the opening 55. The socket may be formed with a detent 57 at the end of cam paths formed in said socket in the same manner as has been described in connection with the preceding figures.

An important difference in operation between this modification and the fastener previously described is that in this embodiment the load at all times, where a pulling strain is imposed, must be against the compressive action of the spring 53. This is due to the absence of an inner shoulder in the collar 46 against which the stud head 51 of the stud may lodge. In this type of fastener reduced diameters are possible, due to the absence of the inner shoulder in the spring retaining collar, and thus the fastener can be utilized where space is limited and strength not a paramount consideration. The use of a square stock spring in this type fastener prevents the convolutions of the spring to override each other under compression and thus makes the parts more secure in their assembly.

Of course, it is apparent that many changes in details of construction and rearrangement of the parts, as well as changes in the method of assembly thereof, might be resorted to without in the slightest departing from the scope of the invention as defined by the attached parts.

Having described the invention, what is claimed is:

1. An article of the character described including in combination a spring retainer adapted for mounting on a member, said retainer being formed with an opening extending therethrough, a rotatable stud positioned within and through said spring retainer and having one end extending beyond the same, transversely extending abutments formed on said stud adjacent the end thereof and beyond the lower edge of said retainer, a manipulating head portion formed at the opposite end of said stud, a resilient member interposed between said stud head and said spring retainer and a socket member formed with opposed spiral trackway portions and adapted to be mounted on a second member, said stud abutments cooperating with said trackway portions of said socket member upon rotation of said stud to hold said elements in resilient contact with one another.

2. An article of the character described including in combination a spring retainer adapted for mounting on a member, said retainer being formed with an opening extending therethrough, a rotatable stud positioned within and through said spring retainer and having one end extending beyond the same, transversely extending abutments formed on said stud adjacent the end thereof and beyond the lower edge of said retainer, a manipulating head portion formed at the opposite end of said stud, a resilient member interposed between said stud head and said spring retainer, a socket member formed with opposed spiral trackway portions and adapted to be mounted on a second member, said stud abutments cooperating with said trackway portions of said socket member upon rotation of said stud to hold said members in resilient contact with one another and detents located adjacent the ends of said trackway portions for accommodating said stud abutments and maintaining the same against further movement.

3. An article of the character described including in combination a spring retainer adapted for mounting on a member, said retainer being formed with an opening extending therethrough and having an external bevelled centering and bearing surface intermediate its ends, a rotatable stud positioned within and through said spring retainer and having one end extending beyond the same, transversely extending abutments formed on said stud adjacent the end thereof and beyond the lower edge of said retainer, a manipulating head portion formed at the opposite end of said stud, a resilient member interposed between said stud head and said spring retainer, a socket member having an internal bevelled centering and bearing surface cooperating with the centering and bearing surface of said spring retainer and formed with opposed spiral trackway portions and adapted to be mounted on a second member, said stud abutments cooperating with said trackway portions of said socket member upon rotation of said stud to hold said members in resilient contact with one another and detents located adjacent the ends of said trackway portions for accommodating said stud abutments and maintaining the same against retrogression or further movement.

4. An article of the character described including in combination a spring retainer adapted for mounting on a member, said retainer being formed with an opening extending therethrough and having an external bevelled centering and bearing surface intermediate its ends, a rotatable stud positioned within and through said spring retainer and having one end extending beyond the same, transversely extending abutments formed on said stud adjacent the end thereof and beyond the lower edge of said retainer, a manipulating head portion formed at the opposite end of said stud, a resilient member interposed between said stud head and said spring retainer and a socket member having an internal bevelled centering and bearing surface cooperating with the centering and bearing surface of said spring retainer and adapted to be mounted on a second member and having a spring retainer accommodating recess and being formed with opposed spiral trackway portions, said stud abutments cooperating with said trackway portions of said socket member upon rotation of said stud to hold said members in resilient contact with one another.

5. An article of the character described including in combination a spring retaining cup member adapted for mounting on a member, said cup being formed with a center opening extending through the base thereof, a rotatable stud positioned within said cup member and having its one end extending through the opening in the base thereof, transversely extending abutments formed on said stud adjacent the end thereof and beyond the base of said cup member, a manipulating head portion formed at the opposite end of said stud, a resilient member interposed between said stud head and the base of said cup member and adapted to normally hold said stud head out of contact with said cup base, and a socket member formed with opposed spiral trackway portions and adapted to be mounted on a second member to be secured to said first member, said stud abutments cooperating with said trackway portions of said socket member upon rotation of said stud to hold said members in resilient relationship.

6. An article of the character described including in combination a spring retaining cup member adapted for mounting on a member so that one surface thereof is substantially flush with one side of said member, said cup being formed with a center opening extending through the base thereof, a rotatable stud positioned within said cup member and having its one end extending through the opening in the base thereof, transversely extending abutments formed on said stud adjacent the end thereof and beyond the base of said cup member, a manipulating head portion formed at the opposite end of said stud, a resilient member interposed between said stud head and the base of said cup member and adapted to normally hold said stud head out of contact with said cup base, and a socket member formed with opposed spiral trackway portions and adapted to be mounted on a second member to be secured to said first member, said stud abutments cooperating with said trackway portions of said socket member upon rotation of said stud to bring said stud head below the top of said cup member and hold said members in resilient relationship.

7. An article of the character described including in combination a spring retaining cup member adapted for mounting on a member so that one surface thereof is substantially flush with one side of said member, said cup being formed with an internal shoulder adjacent its upper end and having a central opening extending through the base thereof, a rotatable stud positioned within said cup member and having its one end extending through the opening in the base thereof, transversely extending abutments formed on said stud adjacent the end thereof and beyond the base of said cup member, a manipulating head portion formed at the opposite end of said stud, a resilient member interposed between said stud head and the base of said cup member and adapted to normally hold said stud head out of contact with said cup base, a socket member formed with opposed spiral trackway portions and adapted to be mounted on a second member to be secured to said first member, said stud abutments cooperating with said trackway portions of said socket member upon rotation of said stud to hold said members in resilient relationship and said manipulating head cooperating with said internal shoulder in said spring retaining cup member to prevent separation of said members beyond a predetermined limit.

8. An article of the character described including in combination a spring retainer adapted for mounting on a member, said retainer being formed with an opening extending therethrough, a rotatable stud positioned within and through said opening and having one end extending beyond the same, a cross bar associated with said stud adjacent the end thereof and beyond the lower edge of said retainer, a manipulating head portion formed at the opposite end of said stud, a resilient member interposed between said stud head and said retainer, a socket member formed with opposed spiral trackway portions and adapted to be mounted on a second member, said cross bar cooperating with said trackway portions of said socket member upon rotation of said stud to hold said members in secured relationship, detents located at the ends of said trackway portions for accommodating said cross bar, and means defining limits of said detents to prevent shifting longitudinally of said cross bar.

9. An article of the character described including in combination a spring retaining cup, an upwardly extending flange associated therewith and adapted to be flared outwardly in securing said cup to a member, said cup being formed with a central opening extending therethrough, a rotatable stud positioned within said opening and having one end extend beyond the same, transversely extending abutments formed on said stud adjacent the end thereof and beyond the lower edge of said cup, a manipulating head portion formed at the opposite end of said stud, a resilient member interposed between said stud head and the base of said cup, and a socket member formed with an upwardly depending flange adapted to be flared outwardly to secure said socket member to a second member, said socket member having a cup accommodating recess formed therein and having opposed spiral trackway portions for cooperation with said stud abutments upon rotation of said stud to hold the members to which the respective parts are secured in resilient contact with one another.

10. An article of the character described including in combination a spring retaining cup, an upwardly extending flange associated therewith and adapted to be flared outwardly in securing said cup to a member, said cup being formed with a central opening extending therethrough, a rotatable stud positioned within said opening and having one end extend beyond the same, transversely extending abutments formed on said stud adjacent the end thereof and beyond the lower edge of said cup, a manipulating head portion formed at the opposite end of said stud, a resilient member interposed between said stud head and the base of said cup, and a socket member, said socket member having a cup accommodating recess formed therein and having opposed spiral trackway portions for cooperation with said stud abutments upon rotation of said stud to hold the members to which the respective parts are secured in resilient contact with one another, the point of contact between said cup and said socket member during shear stresses in the members to which they are respectively attached being substantially at the point of alignment of said members.

11. An article of the character described including in combination a spring retaining cup member adapted for mounting on a member, said cup being formed with a central opening extending therethrough, a rotatable stud positioned within and through said opening, transversely extending abutments formed on said stud adjacent the end thereof and beyond the base of said cup, a manipulating head portion formed at the opposite end of said stud, a resilient member interposed between said stud head and the base of said cup, and a socket member formed with opposed spiral trackway portions and adapted to be mounted on a second member, said stud abutments cooperating with said trackway portions of said socket member upon rotation of said stud to hold said members in resilient contact, and said stud head being adapted to compress said resilient member upon the base of said cup in the event of separation of said members during periods of stress thus limiting further separation thereof.

J MILLS SUMMERS.